United States Patent
Yomo et al.

(10) Patent No.: US 11,512,224 B2
(45) Date of Patent: Nov. 29, 2022

(54) WATER-BASED COATING COMPOSITION AND PRODUCTION METHOD OF THE SAME

(71) Applicant: TOYOTA JIDOSHA KABUSHIKI KAISHA, Toyota (JP)

(72) Inventors: Shuji Yomo, Nagakute (JP); Keiji Ambo, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 22 days.

(21) Appl. No.: 16/657,305

(22) Filed: Oct. 18, 2019

(65) Prior Publication Data
US 2020/0131400 A1   Apr. 30, 2020

(30) Foreign Application Priority Data

Oct. 26, 2018 (JP) .............................. JP2018-202066
Mar. 1, 2019 (JP) .............................. JP2019-037843

(51) Int. Cl.
| | | |
|---|---|---|
| C08G 18/24 | (2006.01) | |
| C09D 5/02 | (2006.01) | |
| C09D 175/14 | (2006.01) | |
| C09D 7/45 | (2018.01) | |
| C09D 7/20 | (2018.01) | |
| C08G 18/22 | (2006.01) | |
| C08G 18/62 | (2006.01) | |

(52) U.S. Cl.
CPC ......... C09D 175/14 (2013.01); C08G 18/222 (2013.01); C08G 18/227 (2013.01); C08G 18/246 (2013.01); C08G 18/6229 (2013.01); C09D 5/027 (2013.01); C09D 7/20 (2018.01); C09D 7/45 (2018.01)

(58) Field of Classification Search
CPC ............ C08G 18/6229; C08G 18/6254; C08G 18/24; C08G 18/222; C08G 18/227; C08G 18/246; C09D 7/45; C09D 5/027
See application file for complete search history.

(56) References Cited

U.S. PATENT DOCUMENTS

2007/0238800 A1* 10/2007 Neal .................... C08G 18/283
521/174
2010/0068486 A1* 3/2010 Kayanoki ......... B32B 17/10165
428/213

FOREIGN PATENT DOCUMENTS

| CN | 101200616 A | | 6/2008 |
|---|---|---|---|
| JP | 2005076011 A | * | 3/2005 |
| JP | 2005076011 A | | 3/2005 |
| JP | 2017-043759 A | | 3/2017 |
| JP | 2017-193705 A | | 10/2017 |

OTHER PUBLICATIONS

Machine translation into English of JP 2005076011-A; Ueda et al (Year: 2005).*
Bayhydrol A 2058 Data Sheet; Downloaded on Jul. 6, 2022.*
Rheodol TW-0106 V Data sheet; Downloaded on Jul. 6, 2022.*
Duranate WB 40-80d Data sheet; Downloaded on Jul. 6, 2022.*
Yang Hongli, "Training Guide for Basic Chemistry", Northwestern Polytechnical University Press, Oct. 2016, p. 106 (2 pages).
English Translation of Second Office Action dated Aug. 12, 2021 by the China National Intellectual Property Administration in application No. 201911010539.4.

* cited by examiner

*Primary Examiner* — Karuna P Reddy
(74) *Attorney, Agent, or Firm* — Sughrue Mion, PLLC

(57) ABSTRACT

A water-based coating composition including: a polyol; a polyisocyanate; a hydrophobic curing catalyst which is made of an organometallic compound containing at least one metal atom selected from the group consisting of Sn, Bi, Zr, Ti, and Al and of which solubility in water under conditions of atmospheric pressure at 20° C. is 1 g/100 ml or less; and a nonionic surfactant of which an HLB value determined by a Griffin method is 10 to 15.

1 Claim, 2 Drawing Sheets

WATER-BASED COATING COMPOSITION AND PRODUCTION METHOD OF THE SAME

INCORPORATION BY REFERENCE

The disclosure of Japanese Patent Application No. 2019-037843 filed on Mar. 1, 2019 including the specification, drawings and abstract is incorporated herein by reference in its entirety.

BACKGROUND

1. Technical Field

The disclosure relates to a water-based coating composition and a production method of the same, and relates more specifically to an isocyanate-curable water-based coating composition and a production method of the same.

2. Description of Related Art

In coating of an automobile, designing a baking temperature of a thermosetting coating to be low is a major issue from the viewpoints of reduction in energy in a baking furnace and reduction in an amount of emission of $CO_2$. For the reason, in the related art, lowering of a baking temperature is achieved by blending a coating with a curing catalyst.

For example, Japanese Unexamined Patent Application Publication No. 2017-193705 (JP 2017-193705 A) discloses a coating composition containing a polyol, a polyisocyanate, a curing catalyst such as a bismuth compound, and carboxylic acid having 8 or more carbon atoms and also discloses that the coating composition is excellent in storage stability and is excellent in curability under a high humidity condition. However, when the coating composition described in JP 2017-193705 A is stored for a long time, gelation is caused even at a temperature (for example, 40° C.) which is extremely lower than a baking temperature, and thus it is difficult to store the coating composition for a long time.

In addition, Japanese Unexamined Patent Application Publication No. 2017-043759 (JP 2017-043759 A) discloses an one-pack curable epoxy emulsion containing polyepoxide, at least one curing catalyst selected from the group consisting of a diazabicycloundecene salt and a diazabicyclononene salt, and a nonionic surfactant, and also discloses that the one-pack curable epoxy emulsion has satisfactory storage stability for a long period and low-temperature curability.

SUMMARY

However, the present inventors found that the following problem arises. Even when an isocyanate-curable water-based coating composition containing a polyol and a polyisocyanate is blended with the curing catalyst and the nonionic surfactant described in JP 2017-043759 A, and the curing catalyst is protected by being encapsulated in a micelle formed by the nonionic surfactant, because the curing catalyst is hydrophilic, the curing catalyst is diffused to the outside of the micelle over time and promotes reaction between the polyol and the polyisocyanate. Therefore, sufficient storage stability cannot be obtained.

The disclosure provides an isocyanate-curable water-based coating composition having both of excellent low-temperature curability and satisfactory storage stability for a long time, and a production method of the same.

As a result of intensive research conducted to achieve the above object, the present inventors found that an isocyanate-curable water-based coating composition having both of excellent low-temperature curability and satisfactory storage stability for a long time can be obtained by mixing a hydrophobic curing catalyst and a nonionic surfactant having an HLB value within a specific range in advance to protect the hydrophobic curing catalyst with the nonionic surfactant, and blending a water-based coating composition containing a polyol and a polyisocyanate with the hydrophobic curing catalyst protected with the nonionic surfactant, and completed the disclosure.

That is, a first aspect of the disclosure relates to a water-based coating composition including a polyol, a polyisocyanate, a hydrophobic curing catalyst, and a nonionic surfactant. The hydrophobic curing catalyst is made of an organometallic compound containing at least one metal atom selected from the group consisting of Sn, Bi, Zr, Ti, and Al and has solubility in water under conditions of atmospheric pressure at 20° C. of 1 g/100 ml or less. The nonionic surfactant has an HLB value determined by a Griffin method of 10 to 15.

The hydrophobic curing catalyst may be encapsulated in a micelle formed by the nonionic surfactant. Moreover, the water-based coating composition may not contain an organic solvent. The water-based coating composition may contain an organic solvent having solubility in water at 20° C. of 10 g/100 ml or greater and a boiling point of 50° C. to 200° C. may be contained.

In addition, a second aspect of the disclosure relates to a method of producing a water-based coating composition. The method includes mixing a hydrophobic curing catalyst which is made of an organometallic compound containing at least one metal atom selected from the group consisting of Sn, Bi, Zr, Ti, and Al and of which solubility in water under conditions of atmospheric pressure at 20° C. is 1 g/100 ml or less with a nonionic surfactant of which an HLB value determined by a Griffin method is 10 to 15 to prepare a curing catalyst-containing surfactant aqueous solution, and mixing a polyol, a polyisocyanate, and the curing catalyst-containing surfactant aqueous solution.

When the polyol, the polyisocyanate, and the curing catalyst-containing surfactant aqueous solution are mixed together, an organic solvent may be not mixed therewith or an organic solvent which has solubility in water at 20° C. of 10 g/100 ml or greater and a boiling point of 50° C. to 200° C. may be further mixed therewith.

In addition, the HLB value refers to a value indicating the degree of hydrophilicity or lipophilicity (hydrophobicity) of a surfactant, and can be determined by the Griffin method represented by the following expression.

HLB value=20×Sum of formula weights of hydrophilic group part/Molecular weight of nonionic surfactant In addition, the reason why the water-based coating composition according to the aspect of the disclosure has both of excellent low-temperature curability and satisfactory storage stability for a long time is not necessarily clear, but the present inventors estimate as follows. That is, in the water-based coating composition according to the aspect of the disclosure, the hydrophobic curing catalyst is protected with the nonionic surfactant having a predetermined HLB value (preferably, by being encapsulated in a micelle formed by the nonionic surfactant). In the hydrophobic curing catalyst protected with the nonionic surfactant in such a manner, molecular motion of the curing catalyst is suppressed in a temperature range from room temperature to a temperature near 40° C. For the reason, in the hydrophobic curing catalyst, the contact with a polyol and a polyisocyanate is suppressed to suppress the development of a catalytic function, and thus it is estimated that the water-based coating composition according to the aspect of the disclosure can be stored for a long time at a temperature of 40° C. or lower, that is, exhibits satisfactory storage stability for a long time. On the other hand, the hydrophobic curing catalyst protected with the nonionic surfactant is liberated from the protection with the nonionic surfactant (in a case where a micelle is formed, stability of the micelle is deteriorated and the micelle is disintegrated to liberate the hydrophobic curing catalyst from the protection with the nonionic surfactant) at a temperature of 50° C. or higher, and thus the molecular motion becomes active. For the reason, the hydrophobic curing catalyst is activated by the contact with a polyol and a polyisocyanate, and thus it is estimated that the water-based coating composition according to the aspect of the disclosure undergoes curing reaction even at a low temperature (for example, 100° C.) and exhibits excellent curability. Moreover, in the disclosure, such a characteristic, that is, a characteristic in which the development of the catalytic function is suppressed at a certain temperature or lower and the catalytic function is developed by increasing a temperature to a certain temperature or higher is referred to as "switching properties".

With the aspects of the disclosure, it is possible to obtain the isocyanate-curable water-based coating composition having both of excellent low-temperature curability (for example, curability at 100° C.) and satisfactory storage stability for a long time (for example, storage stability at 40° C. for eight hours).

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
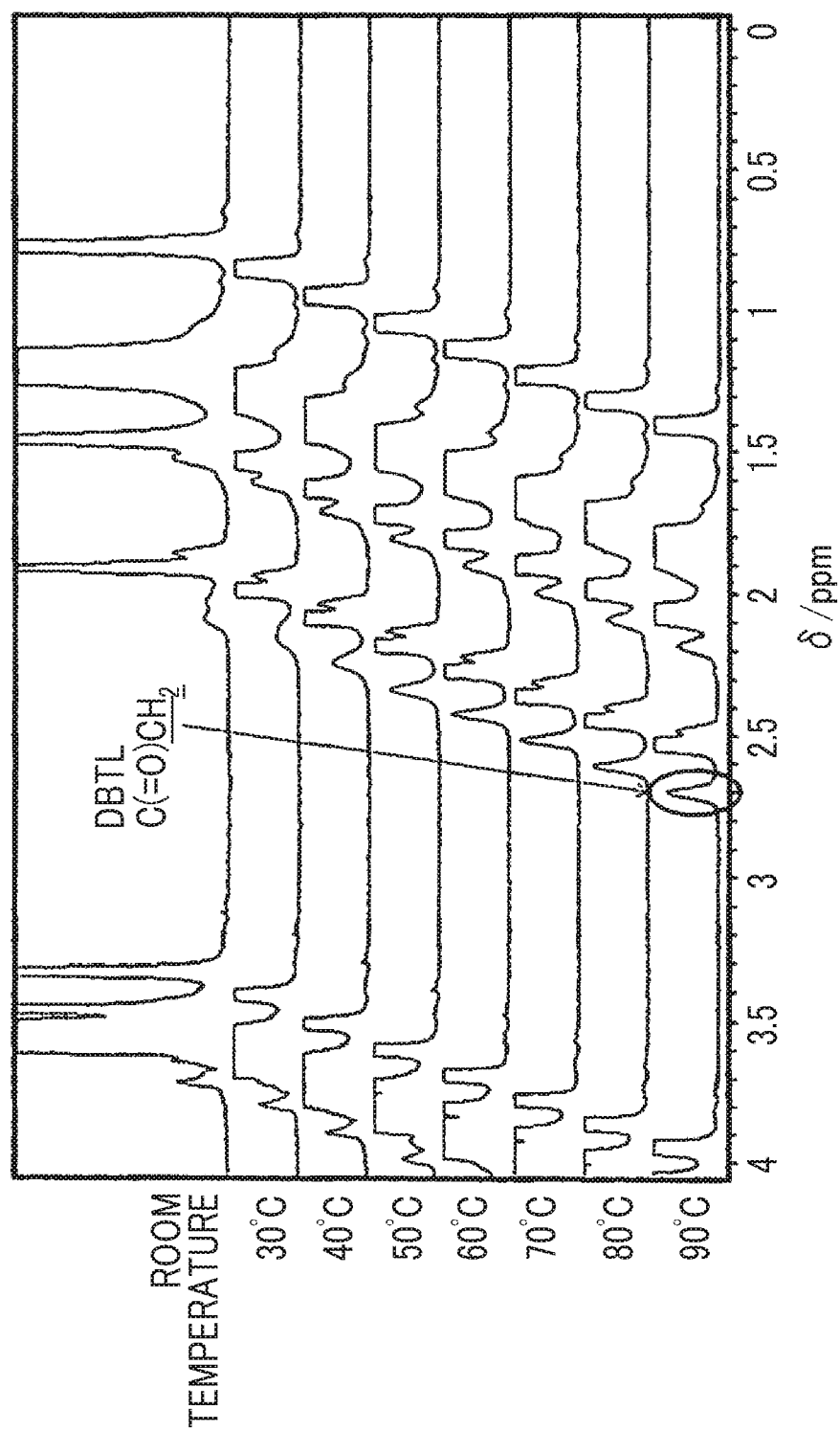
FIG. 1 is a graph showing $^1$H-NMR spectra of a curing catalyst-containing surfactant aqueous solution prepared in Example 1.

Hereinafter, the disclosure will be described in detail with reference to suitable embodiments.

First, a water-based coating composition according to the embodiment of the disclosure will be described. The water-based coating composition according to the embodiment of the disclosure includes: a polyol; a polyisocyanate; a hydrophobic curing catalyst which is made of an organometallic compound containing at least one metal atom selected from the group consisting of Sn, Bi, Zr, Ti, and Al and of which solubility in water under conditions of atmospheric pressure at 20° C. is 1 g/100 ml or less; and a nonionic surfactant of which an HLB value determined by a Griffin method is 10 to 15. Since the hydrophobic curing catalyst is protected with the nonionic surfactant (preferably, by encapsulation of the hydrophobic curing catalyst in a micelle formed by the nonionic surfactant) in a temperature range from room temperature to a temperature near 40° C., the water-based coating composition has satisfactory storage stability for a long time, and since the hydrophobic curing catalyst is liberated from the protection with the nonionic surfactant (in a case where a micelle is formed, stability of the micelle is deteriorated and the micelle is disintegrated to liberate the hydrophobic curing catalyst from the protection with the nonionic surfactant) at a temperature of 50° C. or higher (for example, 100° C.), the water-based coating composition exhibits excellent low-temperature curability.

The polyol is not particularly limited as long as the polyol is a polymer polyol used as a base resin in an isocyanate-curable water-based coating composition, and examples thereof include an acrylic resin (acrylic polyol), a polyester resin (polyester polyol), an alkyd resin (alkyd polyol), an epoxy resin (epoxy polyol), and a urethane resin (polyurethane polyol), which contain a hydroxyl group. The polyols may be used alone or in combination of two or more kinds thereof. Among the polyols, from the viewpoint that coating film performance is sufficiently ensured, an acrylic resin (acrylic polyol), a polyester resin (polyester polyol), and a urethane resin (polyurethane polyol), which contain a hydroxyl group, are preferable. Moreover, from the viewpoint that the coating film performance is sufficiently ensured, the content of the polyol is preferably 20 mass % to 90 mass %, more preferably 30 mass % to 85 mass %, and particularly preferably 40 mass % to 80 mass % with respect to 100 mass % of the total amount of the polyol and the polyisocyanate.

The polyisocyanate is not particularly limited as long as the polyisocyanate is a polyisocyanate used as a curing agent in an isocyanate-curable water-based coating composition, and examples thereof include an isocyanate compound, a blocked isocyanate compound, an isocyanate resin, and a blocked isocyanate resin. The polyisocyanates may be used alone or in combination of two or more kinds thereof. Among the polyisocyanates, from the viewpoint that coating film performance is sufficiently ensured, an isocyanate compound is preferable. Moreover, from the viewpoint that the coating film performance is sufficiently ensured, the content of the polyisocyanate is preferably 10 mass % to 80 mass %, more preferably 15 mass % to 70 mass %, and particularly preferably 20 mass % to 60 mass % with respect to 100 mass % of the total amount of the polyol and the polyisocyanate.

The hydrophobic curing catalyst used in the embodiment has solubility in water under conditions of atmospheric pressure at 20° C. of 1 g/100 ml or less. By using such a hydrophobic curing catalyst, the curing catalyst is easily protected with the nonionic surfactant (preferably, by encapsulation of the curing catalyst in the micelle formed by the nonionic surfactant described later) in a temperature range from room temperature to a temperature near 40° C., and the water-based coating composition can be stored for a long time. On the other hand, when the solubility of the curing catalyst in water (under conditions of atmospheric pressure at 20° C.) exceeds the upper limit, the hydrophilicity of the curing catalyst is increased. Therefore, the curing catalyst is liberated from the protection with the nonionic surfactant described later (preferably, by encapsulation of the curing catalyst in the micelle formed by the nonionic surfactant described later) and is easily diffused in an aqueous solvent, reaction between the polyol and the polyisocyanate proceeds by the action of the curing catalyst even in a temperature range from room temperature to a temperature near 40° C., and the storage stability for a long time is deteriorated. Moreover, from the viewpoints that the hydrophobicity of the curing catalyst is increased, the curing catalyst is more easily protected with the nonionic surfactant (preferably, by encapsulation of the curing catalyst in the micelle formed by the nonionic surfactant described later) in a temperature range from room temperature to a temperature near 40° C., and the storage stability of the water-based coating composition is improved, the solubility of the hydrophobic curing catalyst in water (under conditions of atmospheric pressure at 20° C.) is preferably 0.5 g/100 ml or less.

In addition, the hydrophobic curing catalyst used in the embodiment is made of an organometallic compound containing at least one metal atom selected from the group consisting of Sn, Bi, Zr, Ti, and Al. By using the organometallic compound containing the metal atom for the curing catalyst, it is possible to allow the reaction between the polyol and the polyisocyanate to proceed at a relatively low temperature (for example, 100° C.) and to perform baking of a coating film formed of the isocyanate-curable water-based coating composition at a relatively low temperature (for example, 100° C.).

The number of carbon atoms in an organic chain constituting the organometallic compound is preferably 3 or more, more preferably 5 or more, and particularly preferably 8 or more. By doing so, the hydrophobicity of the curing catalyst is improved (the solubility in water is decreased) and the storage stability of the water-based coating composition is improved. On the other hand, when the number of carbon atoms in the organic chain is less than the lower limit, the hydrophobicity of the curing catalyst tends to be decreased (the solubility in water is increased) and the storage stability of the water-based coating composition tends to be deteriorated. Moreover, the upper limit of the number of carbon atoms in the organic chain is not particularly limited, but is preferably 20 or less from the viewpoint of ensuring the stability of the curing catalyst in the water-based coating composition.

In addition, the organometallic compound preferably contains an oxygen atom. By doing so, switching properties are easily developed regardless of the number of carbon atoms in the organometallic compound.

Specific examples of the hydrophobic curing catalyst include dibutyltin dilaurate (0.1 g/100 ml or less), bismuth 2-ethylhexanoate (0.1 g/100 ml or less), zirconium tetraacetylacetonate (0.1 g/100 ml or less), tetraoctyl titanate (0.1 g/100 ml or less), titanium ethyl acetoacetate (0.1 g/100 ml or less), and aluminum trisacetylacetonate (0.1 g/100 ml or less) (numerical values in parentheses indicate solubility in water under conditions of atmospheric pressure at 20° C.).

In addition, from the viewpoint of the storage stability of the water-based coating composition and the coating film performance, the content of the hydrophobic curing catalyst is preferably 0.001 mass % to 10 mass %, more preferably 0.01 mass % to 5 mass %, and particularly preferably 0.01 mass % to 1.0 mass % with respect to the total amount of the water-based coating composition.

The nonionic surfactant used in the embodiment has an HLB value determined by the Griffin method of 10 to 15. The nonionic surfactant having such an HLB value can protect the hydrophobic curing catalyst in an aqueous solution (preferably, protect the hydrophobic curing catalyst by forming the micelle and encapsulating the hydrophobic curing catalyst therein) in a temperature range from room temperature to a temperature near 40° C., and thus the water-based coating composition can be stored for a long time. Moreover, since the nonionic surfactant liberates the hydrophobic curing catalyst (in a case where a micelle is formed, stability of the micelle is deteriorated and the micelle is disintegrated to liberate the hydrophobic curing catalyst) at a temperature of 50° C. or higher (for example, 100° C.), the water-based coating composition according to the embodiment exhibits excellent low-temperature curability. When the HLB value of the nonionic surfactant is less than the lower limit, the hydrophobic curing catalyst is not protected with the nonionic surfactant (particularly, since the hydrophobic curing catalyst is not taken into a micelle formed by the nonionic surfactant), and thus the storage stability for a long time of the water-based coating composition is deteriorated. When the HLB value of the nonionic surfactant exceeds the upper limit, the hydrophobic curing catalyst is not liberated (in a case where a micelle is formed, the micelle is stable and is not disintegrated, and thus the hydrophobic curing catalyst is not liberated) even at a temperature of 50° C. or higher (for example, 100° C.), and thus the low-temperature curability of the water-based coating composition is deteriorated. Moreover, from the viewpoints that in a temperature range from room temperature to a temperature near 40° C., the hydrophobic curing catalyst is more easily protected in an aqueous solution (preferably, more easily protected by forming the micelle and encapsulating the hydrophobic curing catalyst in the micelle), and thus the storage stability of the water-based coating composition is improved, and at a temperature of 50° C. or higher (for example, 100° C.), the hydrophobic curing catalyst is liberated (in a case where a micelle is formed, stability of the micelle is deteriorated and the micelle is disintegrated to liberate the hydrophobic curing catalyst), and thus the low-temperature curability of the water-based coating composition is improved, the HLB value of the nonionic surfactant is preferably 12 to 14.5 and more preferably 13 to 14.

The molecular weight of the nonionic surfactant is preferably 100 to 5000 and more preferably 300 to 1500. When the molecular weight of the nonionic surfactant is less than the lower limit, the micelle tends to be easily disintegrated in a temperature range from room temperature to a temperature near 40° C., and when the molecular weight exceeds the upper limit, the micelle is difficult to be uniformly dissolved in water and tends to be hardly disintegrated at a temperature of 50° C. or higher (for example, 100° C.).

Specific examples of the nonionic surfactant include ether-type nonionic surfactants such as polyoxyethylene-oleyl ether (for example, NONION E-212 (HLB value: 13.3) and NONION E-215 (HLB value: 14.2), both manufactured by NOF CORPORATION), polyoxyethylene-isodecyl ether (for example, NONION ID-206 (HLB value: 12.5) and NONION ID-209 (HLB value: 14.3), both manufactured by NOF CORPORATION), polyoxyethylene-2-ethylhexyl-ether (for example, NONION EH-208 (HLB value: 14.6) manufactured by NOF CORPORATION), and polyoxyethylene-stearyl ether (for example, NONION S-215 (HLB value: 14.2) manufactured by NOF CORPORATION).

The content of the nonionic surfactant is not particularly limited as long as the content is a content in which the concentration of the nonionic surfactant in the obtained water-based coating composition is equal to or higher than the critical micelle concentration, and is preferably 0.1 mass % to 20 mass %, more preferably 0.1 mass % to 10 mass %, and particularly preferably 0.1 mass % to 5 mass % with respect to the total amount of the water-based coating composition, from the viewpoint of ensuring water resistance of the coating film.

In addition, an organic solvent may be contained in the water-based coating composition according to the embodiment. As such an organic solvent, an organic solvent having solubility in water at 20° C. of 10 g/100 ml or greater and a boiling point of 50° C. to 200° C. is preferable. By using the organic solvent having the solubility in water and the boiling point which are within the above range, generation of bubbles when the water-based coating composition is applied can be suppressed, and both of the excellent low-temperature curability (for example, curability at 100° C.) and the satisfactory storage stability for a long time (for example, storage stability at 40° C. for eight hours) can be maintained even in a case where the organic solvent is contained in the water-based coating composition. The reason for this is considered that the organic solvent having the solubility in water and the boiling point within the above range has high hydrophilicity and a low boiling point, and is difficult to be taken into the nonionic surfactant protecting the hydrophobic curing catalyst, and thus the curing catalyst is not liberated from the protection with the nonionic surfactant and is stably protected (in a case where the nonionic surfactant forms a micelle, the organic solvent is difficult to be taken into the micelle encapsulating the hydrophobic curing catalyst, and thus the curing catalyst is not released from the micelle and is stably protected).

Examples of the organic solvent having the solubility in water and the boiling point within the above range include 1-propanol, 2-propanol, 1-butanol, 1-methoxy-2-propanol, and ethylene glycol monobutyl ether. Moreover, the content of the organic solvent is preferably 30 parts by mass or less, more preferably 10 parts by mass or less, and still more preferably 5 parts by mass or less with respect to 100 parts by mass of the resin component in the water-based coating composition.

In addition, in the water-based coating composition according to the embodiment, as needed, a coloring pigment or a photoluminescent pigment known in the related art may be contained within a range known in the related art. In order to adjust various physical properties, various additives such as a viscosity controlling agent, a surface adjuster, a thickener, an antioxidant, an ultraviolet absorber, and an antifoaming agent may be blended within a range known in the related art.

In the water-based coating composition according to the embodiment, a reaction rate constant k (100° C.) at 100° C., determined by measuring a relative storage elastic modulus (Er') of the coating film, is preferably 0.09 or greater and more preferably 0.10 or greater. The water-based coating composition having the reaction rate constant k (100° C.) within the above range is excellent in the low-temperature curability (for example, curability at 100° C.).

In addition, in the water-based coating composition according to the embodiment, a ratio [k (70° C.)/k (100° C.)] of a reaction rate constant k (70° C.) at 70° C. to the reaction rate constant k (100° C.) at 100° C., determined by measuring the relative storage elastic modulus (Er') of the coating film, is preferably 0.3 or less and more preferably 0.2 or less. The water-based coating composition having k (70° C.)/k (100° C.) within the above range is excellent in the storage stability.

In the water-based coating composition according to the embodiment, a rate of increase in a viscosity after being left to stand at 40° C. for eight hours with respect to an initial viscosity is preferably 20% or less, more preferably 10% or less, and particularly preferably 5% or less. The water-based coating composition having the rate of increase in the viscosity within the above range is excellent in the storage stability for a long time.

In addition, a baking temperature (curing temperature) of the water-based coating composition according to the embodiment is not particularly limited, but typically 40° C. to 200° C. and preferably 80° C. to 160° C.

Hereinafter, a method of producing a water-based coating composition according to the embodiment will be described. The method of producing a water-based coating composition according to the embodiment is a method in which the hydrophobic curing catalyst is mixed with the nonionic surfactant to prepare a curing catalyst-containing surfactant aqueous solution, and then the polyol, the polyisocyanate, and the curing catalyst-containing surfactant aqueous solution are mixed together to obtain the water-based coating composition according to the embodiment.

In the method of producing a water-based coating composition according to the embodiment, first, the hydrophobic curing catalyst is mixed with the nonionic surfactant to prepare a curing catalyst-containing surfactant aqueous solution. By doing so, the hydrophobic curing catalyst is protected with the nonionic surfactant (preferably, by being encapsulated in a micelle formed by the nonionic surfactant) in a temperature range from room temperature to a temperature near 40° C., and thus the obtained water-based coating composition has the excellent storage stability for a long time. Moreover, at a temperature of 50° C. or higher (for example, 100° C.), the hydrophobic curing catalyst protected with the nonionic surfactant is liberated, and thus the obtained water-based coating composition exhibits the excellent low-temperature curability (for example, curability at 100° C.).

When the curing catalyst-containing surfactant aqueous solution is prepared, it is preferable that after the hydrophobic curing catalyst is mixed with the nonionic surfactant, the obtained mixture is heated at 30° C. to 60° C. for eight hours or longer. By doing so, the hydrophobic curing catalyst is certainly encapsulated in the micelle formed by the nonionic surfactant.

Thereafter, the curing catalyst-containing surfactant aqueous solution prepared in such a manner, the polyol, and the polyisocyanate are mixed together. By doing so, the water-based coating composition according to the embodiment containing the polyol, the polyisocyanate, and the hydrophobic curing catalyst protected with the nonionic surfactant (preferably, the hydrophobic curing catalyst encapsulated in the micelle formed by the nonionic surfactant) is obtained.

Hereinafter, the embodiment will be described in more details based on Examples and Comparative Examples, but the embodiment is not limited to the following Examples. Moreover, polyols used in Examples and Comparative Examples were synthesized by the following method.

Synthesis Example 1

First, 99.0 parts by mass of butyl acrylate, 85.5 parts by mass of butyl methacrylate, 45.0 parts by mass of styrene, 162.0 parts by mass of 2-hydroxyethyl acrylate, 13.5 parts by mass of acrylic acid, 45.0 parts by mass of methyl methacrylate, 4.5 parts by mass of n-dodecyl mercaptan as a chain transfer agent, 170 parts by mass of ion-exchanged water, and 25.0 parts by mass of ammonium polyoxyalkylene alkenyl ether sulfate ("LATEMUL PD-104" manufactured by Kao Corporation) as an emulsion polymerization agent were mixed together and stirred by using a mixer to be emulsified, thereby preparing a monomer pre-emulsion.

Thereafter, an ordinary reaction vessel for producing an acrylic resin emulsion equipped with a stirrer, a thermometer, a dropping funnel, a reflux condenser, and a nitrogen introducing pipe was charged with 320 parts by mass of ion-exchanged water, 5.0 parts by mass of ammonium polyoxyalkylene alkenyl ether sulfate ("LATEMUL PD-104" manufactured by Kao Corporation) as an emulsion polymerization agent, and an ammonium persulfate aqueous solution (obtained by mixing 1.0 part by mass of ammonium persulfate (APS, manufactured by Sigma-Aldrich Co. LLC.) with 10.0 parts by mass of ion-exchanged water) as a polymerization initiator, and was heated to 80° C. with stirring. Next, 5 mass % of the monomer pre-emulsion was added to the reaction vessel, and the state was held at 80° C. for 10 minutes. Then, the remaining monomer pre-emulsion was added dropwise to the reaction vessel over three hours with stirring. After the dropwise addition was completed, stirring was further continued at 80° C. for one hour to cause reaction. Thereafter, 500 parts by mass of ion-exchanged water was added thereto, and the resultant was cooled to room temperature. After cooling, 33.4 parts by mass of a 50 mass % dimethylethanolamine aqueous solution was added thereto, and the resultant was stirred for 10 minutes to prepare an acrylic emulsion containing a hydroxyl group (polyacrylic polyol emulsion).

HLB Value

HLB values of nonionic surfactants used in Examples and Comparative Examples were determined by the following expression.

HLB value=20×Sum of formula weights of hydrophilic group part/Molecular weight of nonionic surfactant Example 1

First, a vessel was charged with 80 parts by mass of ion-exchanged water and 20 parts by mass of a nonionic surfactant having an HLB value of 13.3 ("NONION E-212" manufactured by NOF CORPORATION), and after the nonionic surfactant was dissolved, 2 parts by mass of dibutyltin dilaurate (DBTL, manufactured by Tokyo Chemical Industry Co., Ltd.) as a curing catalyst was added thereto, and the resultant was stirred at 60° C. for eight hours to prepare a curing catalyst-containing surfactant aqueous solution S-1. Moreover, solubility of the dibutyltin dilaurate in water under conditions of atmospheric pressure at 20° C. was 0.1 g/100 ml or less.

Thereafter, 33.0 parts by mass of the polyacrylic polyol emulsion obtained in Synthesis Example 1, 10.5 parts by mass of polyisocyanate ("BURNOCK DNW 5500" manufactured by DIC CORPORATION), and 10.5 parts by mass of ion-exchanged water were mixed together. A water-based coating composition (content of curing catalyst: 0.10 mass %) was prepared by adding 3.0 parts by mass of the curing catalyst-containing surfactant aqueous solution S-1 to the obtained aqueous solution.

Example 2

A curing catalyst-containing surfactant aqueous solution S-2 was prepared in the same manner as in Example 1 except that 20 parts by mass of a nonionic surfactant having an HLB value of 14.2 ("NONION E-215" manufactured by NOF CORPORATION) was used as the nonionic surfactant, and a water-based coating composition (content of curing catalyst: 0.10 mass %) was prepared in the same manner as in Example 1 except that 3.0 parts by mass of the curing catalyst-containing surfactant aqueous solution S-2 was added instead of the curing catalyst-containing surfactant aqueous solution S-1.

Example 3

A curing catalyst-containing surfactant aqueous solution S-3 was prepared in the same manner as in Example 1 except that 20 parts by mass of a nonionic surfactant having an HLB value of 12.5 ("NONION ID-206" manufactured by NOF CORPORATION) was used as the nonionic surfactant, and a water-based coating composition (content of curing catalyst: 0.10 mass %) was prepared in the same manner as in Example 1 except that 3.0 parts by mass of the curing catalyst-containing surfactant aqueous solution S-3 was added instead of the curing catalyst-containing surfactant aqueous solution S-1.

Example 4

A curing catalyst-containing surfactant aqueous solution S-4 was prepared in the same manner as in Example 1 except that 20 parts by mass of a nonionic surfactant having an HLB value of 14.3 ("NONION ID-209" manufactured by NOF CORPORATION) was used as the nonionic surfactant, and a water-based coating composition (content of curing catalyst: 0.10 mass %) was prepared in the same manner as in Example 1 except that 3.0 parts by mass of the curing catalyst-containing surfactant aqueous solution S-4 was added instead of the curing catalyst-containing surfactant aqueous solution S-1.

Example 5

A curing catalyst-containing surfactant aqueous solution S-5 was prepared in the same manner as in Example 1 except that 20 parts by mass of a nonionic surfactant having an HLB value of 14.6 ("NONION EH-208" manufactured by NOF CORPORATION) was used as the nonionic surfactant, and a water-based coating composition (content of curing catalyst: 0.10 mass %) was prepared in the same manner as in Example 1 except that 3.0 parts by mass of the curing catalyst-containing surfactant aqueous solution S-5 was added instead of the curing catalyst-containing surfactant aqueous solution S-1.

Example 6

A curing catalyst-containing surfactant aqueous solution S-6 was prepared in the same manner as in Example 1 except that 2 parts by mass of a bismuth 2-ethylhexanoate mineral spirit solution (2EHBi, manufactured by Wako Pure Chemical Corporation) was used as the curing catalyst, and a water-based coating composition (content of curing catalyst: 0.36 mass %) was prepared in the same manner as in Example 1 except that 12.0 parts by mass of the curing catalyst-containing surfactant aqueous solution S-6 was added instead of the curing catalyst-containing surfactant aqueous solution S-1. Moreover, solubility of the bismuth 2-ethylhexanoate mineral spirit solution in water under conditions of atmospheric pressure at 20° C. was 0.1 g/100 ml or less.

Example 7

A curing catalyst-containing surfactant aqueous solution S-7 was prepared in the same manner as in Example 1 except that 4 parts by mass of zirconium tetraacetylacetonate (Zr(acac)$_4$, "ORGATIX ZC-700" manufactured by Matsumoto Fine Chemical Co., Ltd.) was used as the curing catalyst, and a water-based coating composition (content of curing catalyst: 0.70 mass %) was prepared in the same manner as in Example 1 except that 12.0 parts by mass of the curing catalyst-containing surfactant aqueous solution S-7 was added instead of the curing catalyst-containing surfactant aqueous solution S-1. Moreover, solubility of the zirconium tetraacetylacetonate in water under conditions of atmospheric pressure at 20° C. was 0.1 g/100 ml or less.

Comparative Example 1

A curing catalyst-containing surfactant aqueous solution CS-1 was prepared in the same manner as in Example 1 except that 20 parts by mass of a nonionic surfactant having an HLB value of 4.9 ("NONION E-202" manufactured by NOF CORPORATION) was used as the nonionic surfactant, and a water-based coating composition (content of curing catalyst: 0.10 mass %) was prepared in the same manner as in Example 1 except that 3.0 parts by mass of the curing catalyst-containing surfactant aqueous solution CS-1 was added instead of the curing catalyst-containing surfactant aqueous solution S-1.

Comparative Example 2

A curing catalyst-containing surfactant aqueous solution CS-2 was prepared in the same manner as in Example 1 except that 20 parts by mass of a nonionic surfactant having an HLB value of 9.0 ("NONION E-205" manufactured by NOF CORPORATION) was used as the nonionic surfactant, and a water-based coating composition (content of curing catalyst: 0.10 mass %) was prepared in the same manner as in Example 1 except that 3.0 parts by mass of the curing catalyst-containing surfactant aqueous solution CS-2 was added instead of the curing catalyst-containing surfactant aqueous solution S-1.

Comparative Example 3

A curing catalyst-containing surfactant aqueous solution CS-3 was prepared in the same manner as in Example 1 except that 20 parts by mass of a nonionic surfactant having an HLB value of 16.6 ("NONION E-230" manufactured by NOF CORPORATION) was used as the nonionic surfactant, and a water-based coating composition (content of curing catalyst: 0.10 mass %) was prepared in the same manner as in Example 1 except that 3.0 parts by mass of the curing catalyst-containing surfactant aqueous solution CS-3 was added instead of the curing catalyst-containing surfactant aqueous solution S-1.

Comparative Example 4

A curing catalyst-containing surfactant aqueous solution CS-4 was prepared in the same manner as in Example 6 except that 20 parts by mass of a nonionic surfactant having an HLB value of 9.0 ("NONION E-205" manufactured by NOF CORPORATION) was used as the nonionic surfactant, and a water-based coating composition (content of curing catalyst: 0.36 mass %) was prepared in the same manner as in Example 1 except that 12.0 parts by mass of the curing catalyst-containing surfactant aqueous solution CS-4 was added instead of the curing catalyst-containing surfactant aqueous solution S-1.

Comparative Example 5

A curing catalyst-containing surfactant aqueous solution CS-5 was prepared in the same manner as in Example 6 except that 20 parts by mass of a nonionic surfactant having an HLB value of 16.6 ("NONION E-230" manufactured by NOF CORPORATION) was used as the nonionic surfactant, and a water-based coating composition (content of curing catalyst: 0.36 mass %) was prepared in the same manner as in Example 1 except that 12.0 parts by mass of the curing catalyst-containing surfactant aqueous solution CS-5 was added instead of the curing catalyst-containing surfactant aqueous solution S-1.

Comparative Example 6

A curing catalyst-containing surfactant aqueous solution CS-6 was prepared in the same manner as in Example 7 except that 20 parts by mass of a nonionic surfactant having an HLB value of 9.0 ("NONION E-205" manufactured by NOF CORPORATION) was used as the nonionic surfactant, and a water-based coating composition (content of curing catalyst: 0.70 mass %) was prepared in the same manner as in Example 1 except that 12.0 parts by mass of the curing catalyst-containing surfactant aqueous solution CS-6 was added instead of the curing catalyst-containing surfactant aqueous solution S-1.

Comparative Example 7

A curing catalyst-containing surfactant aqueous solution CS-7 was prepared in the same manner as in Example 7 except that 20 parts by mass of a nonionic surfactant having an HLB value of 16.6 ("NONION E-230" manufactured by NOF CORPORATION) was used as the nonionic surfactant, and a water-based coating composition (content of curing catalyst: 0.70 mass %) was prepared in the same manner as in Example 1 except that 12.0 parts by mass of the curing catalyst-containing surfactant aqueous solution CS-7 was added instead of the curing catalyst-containing surfactant aqueous solution S-1.

Comparative Example 8

A curing catalyst-containing surfactant aqueous solution CS-8 was prepared in the same manner as in Example 1 except that 2 parts by mass of diazabicycloundecene p-toluenesulfonate (DBU salt, manufactured by Sigma-Aldrich Co. LLC.) was used as the curing catalyst, and a water-based coating composition (content of curing catalyst: 0.10 mass %) was prepared in the same manner as in Example 1 except that 3.0 parts by mass of the curing catalyst-containing surfactant aqueous solution CS-8 was added instead of the curing catalyst-containing surfactant aqueous solution S-1. Moreover, solubility of the diazabicycloundecene p-toluenesulfonate in water under conditions of atmospheric pressure at 20° C. was 0.5 g/100 ml or greater.

Comparative Example 9

A curing catalyst-containing surfactant aqueous solution CS-9 was prepared in the same manner as in Example 1 except that 2 parts by mass of diazabicycloundecene (DBU, manufactured by Tokyo Chemical Industry Co., Ltd.) was used as the curing catalyst, and a water-based coating composition (content of curing catalyst: 0.10 mass %) was prepared in the same manner as in Example 1 except that 3.0 parts by mass of the curing catalyst-containing surfactant aqueous solution CS-9 was added instead of the curing catalyst-containing surfactant aqueous solution S-1. Moreover, solubility of the diazabicycloundecene in water under conditions of atmospheric pressure at 20° C. was 0.5 g/100 ml or greater.

Comparative Example 10

A curing catalyst-containing surfactant aqueous solution CS-10 was prepared in the same manner as in Example 1 except that 2 parts by mass of diazabicyclononene (DBN, manufactured by Tokyo Chemical Industry Co., Ltd.) was used as the curing catalyst, and a water-based coating composition (content of curing catalyst: 0.10 mass %) was prepared in the same manner as in Example 1 except that 3.0 parts by mass of the curing catalyst-containing surfactant aqueous solution CS-10 was added instead of the curing catalyst-containing surfactant aqueous solution S-1. Moreover, solubility of the diazabicyclononene in water under conditions of atmospheric pressure at 20° C. was 0.5 g/100 ml or greater.

Comparative Example 11

Thirty-three parts by mass of the polyacrylic polyol emulsion obtained in Synthesis Example 1, 10.5 parts by mass of polyisocyanate ("BURNOCK DNW 5500" manufactured by DIC CORPORATION), and 10.5 parts by mass of acetone were mixed together. A water-based coating composition (content of curing catalyst: 0.10 mass %) was prepared by adding 0.06 parts by mass of dibutyltin dilaurate (DBTL, manufactured by Tokyo Chemical Industry Co., Ltd.) as the curing catalyst to the obtained solution.

Comparative Example 12

A water-based coating composition (content of curing catalyst: 0 mass %) was prepared by mixing 33.0 parts by mass of the polyacrylic polyol emulsion obtained in Synthesis Example 1, 10.5 parts by mass of polyisocyanate ("BURNOCK DNW 5500" manufactured by DIC CORPORATION), and 10.5 parts by mass of ion-exchanged water.

Example 8

A water-based coating composition (content of curing catalyst: 0.10 mass %, content of organic solvent: 5 parts by mass with respect to 100 parts by mass of resin component) was prepared in the same manner as in Example 1 except that 0.1 parts by mass of 1-methoxy-2-propanol (PGME, solubility in water (20° C.): 10 g/100 ml or greater, boiling point: 120° C.) and 10.4 parts by mass of ion-exchanged water were used instead of 10.5 parts by mass of ion-exchanged water.

Example 9

A water-based coating composition (content of curing catalyst: 0.10 mass %, content of organic solvent: 10 parts by mass with respect to 100 parts by mass of resin component) was prepared in the same manner as in Example 1 except that 0.2 parts by mass of 2-propanol (IPA, solubility in water (20° C.): 10 g/100 ml or greater, boiling point: 83° C.) and 10.3 parts by mass of ion-exchanged water were used instead of 10.5 parts by mass of ion-exchanged water.

Example 10

A water-based coating composition (content of curing catalyst: 0.10 mass %, content of organic solvent: 10 parts by mass with respect to 100 parts by mass of resin component) was prepared in the same manner as in Example 1 except that 0.2 parts by mass of 1-propanol (PrOH, solubility in water (20° C.): 10 g/100 ml or greater, boiling point: 97° C.) and 10.3 parts by mass of ion-exchanged water were used instead of 10.5 parts by mass of ion-exchanged water.

Example 11

A water-based coating composition (content of curing catalyst: 0.10 mass %, content of organic solvent: 10 parts by mass with respect to 100 parts by mass of resin component) was prepared in the same manner as in Example 1 except that 0.2 parts by mass of 1-butanol (BuOH, solubility in water (20° C.): 10 g/100 ml, boiling point: 118° C.) and 10.3 parts by mass of ion-exchanged water were used instead of 10.5 parts by mass of ion-exchanged water.

Example 12

A water-based coating composition (content of curing catalyst: 0.10 mass %, content of organic solvent: 10 parts by mass with respect to 100 parts by mass of resin component) was prepared in the same manner as in Example 1 except that 0.2 parts by mass of 1-methoxy-2-propanol (PGME, solubility in water (20° C.): 10 g/100 ml or greater, boiling point: 120° C.) and 10.3 parts by mass of ion-exchanged water were used instead of 10.5 parts by mass of ion-exchanged water.

Example 13

A water-based coating composition (content of curing catalyst: 0.10 mass %, content of organic solvent: 10 parts by mass with respect to 100 parts by mass of resin component) was prepared in the same manner as in Example 1 except that 0.2 parts by mass of ethylene glycol monobutyl ether (EGBE, solubility in water (20° C.): 10 g/100 ml or greater, boiling point: 171° C.) and 10.3 parts by mass of ion-exchanged water were used instead of 10.5 parts by mass of ion-exchanged water.

Example 14

A water-based coating composition (content of curing catalyst: 0.10 mass %, content of organic solvent: 20 parts by mass with respect to 100 parts by mass of resin component) was prepared in the same manner as in Example 1 except that 0.4 parts by mass of 1-methoxy-2-propanol (PGME, solubility in water (20° C.): 10 g/100 ml or greater, boiling point: 120° C.) and 10.1 parts by mass of ion-exchanged water were used instead of 10.5 parts by mass of ion-exchanged water.

Example 15

A water-based coating composition (content of curing catalyst: 0.10 mass %, content of organic solvent: 30 parts by mass with respect to 100 parts by mass of resin component) was prepared in the same manner as in Example 1 except that 0.6 parts by mass of 1-methoxy-2-propanol (PGME, solubility in water (20° C.): 10 g/100 ml or greater, boiling point: 120° C.) and 9.9 parts by mass of ion-exchanged water were used instead of 10.5 parts by mass of ion-exchanged water.

Curing Behavior of Water-Based Coating Composition

The obtained water-based coating composition was applied onto a stainless steel plate (40 mm×50 mm, thickness of 0.5 mm) so that a film thickness after baking was 35±5 μm. Specifically, the stainless steel plate was placed on a horizontal stand, and an adhesive tape having a thickness of 70 μm was attached to a region of about 5 mm from each edge of two opposing sides of the stainless steel plate. After an appropriate amount of the water-based coating composition was added dropwise into the region surrounded by the adhesive tape, a knife having a straight blade edge was slid on the adhesive tape, and the water-based coating composition was applied to a gap between the stainless steel plate and the blade edge of the knife.

Six minutes to eight minutes after a coating film formed of the water-based coating composition was formed on the stainless steel plate, a relative storage elastic modulus (Er') of the coating film was measured by using a rigid-body pendulum type physical properties testing instrument ("RPT-5000 type" manufactured by A&D Company, Limited) equipped with an annular pendulum which had a diameter of 74 mm and a knife edge with a blade edge angle of 40° and by a temperature program in which a temperature rose from room temperature (25° C.) to a baking temperature (70° C., 100° C., or 140° C.) at a temperature rising rate of 20±4° C./minutes, and then was maintained at the baking temperature (70° C., 100° C., or 140° C.). The measurement was continued until 15 minutes or longer elapsed from the following inflection point.

The obtained measurement value of the relative storage elastic modulus (Er') was plotted with respect to a time, the following expression was applied to a portion of 15 minutes from a point (hereinafter, the point where a curve changed is referred to as an "inflection point") where a curve changed from a downward projected curve to an upward projected curve according to the lapse of a time, and thus a reaction rate constant k was determined by a nonlinear least-squares method. The results are shown in Tables 1 to 4. Moreover, a greater k value indicates that curing is proceeding.

$$Er' = A[1 - \exp\{k(t - t_d)\}]$$

(in the expression, A represents a constant, k represents a reaction rate constant, t represents a time, and $t_d$ represents a reaction start time)

Storage Stability of Water-Based Coating Composition

The obtained water-based coating composition was left to stand for eight hours in an oven set to 40° C. and viscosities of the water-based coating composition before and after being left to stand were measured by using a viscoelasticity measuring apparatus ("ARES-G2 RHEOMETER" manufactured by TA Instruments) under following conditions: a temperature of 25.0±0.1° C.; a shear rate of 1000 s$^{-1}$; geometry with a cone plate having a diameter of 25 mm and an angle of 0.04 rad; and a gap of 50 μm. The results are shown in Tables 1 to 4.

TABLE 1

| | | | Example 1 | Example 2 | Example 3 | Example 4 | Example 5 | Example 6 | Example 7 |
|---|---|---|---|---|---|---|---|---|---|
| Curing catalyst | | | DBTL | DBTL | DBTL | DBTL | DBTL | 2EHBi | Zr(acac)$_4$ |
| Solubility of curing catalyst in water (under atmospheric pressure at 20° C.) | [g/100 ml] | | 0.1 or less | 0.1 or less | 0.1 or less | 0.1 or less | 0.1 or less | 0.1 or less | 0.1 or less |
| Content of catalyst | [mass %] | | 0.10 | 0.10 | 0.10 | 0.10 | 0.10 | 0.36 | 0.70 |
| HLB value of nonionic surfactant | | | 13.3 | 14.2 | 12.5 | 14.3 | 14.6 | 13.3 | 13.3 |
| Reaction rate constant | k (70° C.) | | 0.0225 | 0.0102 | 0.0315 | 0.0155 | 0.0174 | 0.0054 | 0.0101 |
| | k (100° C.) | | 0.1191 | 0.0939 | 0.1172 | 0.1072 | 0.1075 | 0.1098 | 0.1151 |
| | k (140° C.) | | — | — | — | — | — | — | — |
| k (70° C.)/k (100° C.) | | | 0.19 | 0.11 | 0.27 | 0.14 | 0.16 | 0.05 | 0.09 |
| Viscosity | Initial (before being left to stand) | [mPa · s] | 85 | 74 | 92 | 78 | 82 | 90 | 84 |
| | After being left to stand at 40° C. for eight hours | [mPa · s] | 88 | 76 | 100 | 80 | 85 | 94 | 86 |
| | Rate of increase | [%] | 4 | 3 | 9 | 3 | 4 | 4 | 2 |

TABLE 2

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Curing catalyst | | | DBTL | DBTL | DBTL | 2EHBi | 2EHBi | Zr(acac)$_4$ | Zr(acac)$_4$ |
| Solubility of curing catalyst in water (under atmospheric pressure at 20° C.) | [g/100 ml] | | 0.1 or less | 0.1 or less | 0.1 or less | 0.1 or less | 0.1 or less | 0.1 or less | 0.1 or less |
| Content of catalyst | [mass %] | | 0.10 | 0.10 | 0.10 | 0.36 | 0.36 | 0.70 | 0.70 |
| HLB value of nonionic surfactant | | | 4.9 | 9.0 | 16.6 | 9.0 | 16.6 | 9.0 | 16.6 |
| Reaction rate constant | k (70° C.) | | 0.0511 | 0.0455 | 0.0019 | 0.0485 | 0.0035 | 0.0612 | 0.0012 |
| | k (100° C.) | | 0.1211 | 0.1245 | 0.0656 | 0.1165 | 0.0526 | 0.1147 | 0.0469 |
| | k (140° C.) | | — | — | — | — | — | — | — |
| k (70° C.)/k (100° C.) | | | 0.42 | 0.37 | 0.03 | 0.42 | 0.07 | 0.53 | 0.03 |
| Viscosity | Initial (before being left to stand) | [mPa · s] | 80 | 90 | 81 | 83 | 86 | 79 | 84 |
| | After being left to stand at 40° C. for eight hours | [mPa · s] | 104 | 120 | 85 | 112 | 90 | 109 | 88 |
| | Rate of increase | [%] | 30 | 33 | 5 | 35 | 5 | 38 | 5 |

TABLE 3

|  |  | Comparative Example 8 | Comparative Example 9 | Comparative Example 10 | Comparative Example 11 | Comparative Example 12 |
|---|---|---|---|---|---|---|
| Curing catalyst | | DBU salt | DBU | DBN | DBTL | None |
| Solubility of curing catalyst in water [g/100 ml] (under atmospheric pressure at 20° C.) | | 5 or greater | 5 or greater | 5 or greater | 0.1 or less | — |
| Content of catalyst | [mass %] | 0.10 | 0.10 | 0.10 | 0.10 | 0 |
| HLB value of nonionic surfactant | | 13.3 | 13.3 | 13.3 | — | — |
| Reaction rate constant | k (70° C.) | 0.0523 | 0.0587 | 0.0611 | 0.0552 | 0.0047 |
| | k (100° C.) | 0.1158 | 0.1201 | 0.1169 | 0.1195 | 0.0432 |
| | k (140° C.) | — | — | — | — | 0.1199 |
| k (70° C.)/k (100° C.) | | 0.45 | 0.49 | 0.52 | 0.46 | 0.11 |
| Viscosity | Initial (before being left to stand) [mPa · s] | 76 | 91 | 78 | 83 | 77 |
| | After being left to stand at 40° C. for eight hours [mPa · s] | Gelation | Gelation | Gelation | Gelation | 81 |
| | Rate of increase [%] | — | — | — | — | 5 |

TABLE 4

|  |  | Example 8 | Example 9 | Example 10 | Example 11 | Example 12 | Example 13 | Example 14 | Example 15 |
|---|---|---|---|---|---|---|---|---|---|
| Curing catalyst | | DBTL | DBTL | DBTL | DBTL | DBTL | DBTL | DBTL | DBTL |
| Solubility of curing catalyst in water (under atmospheric pressure at 20° C.) | [g/100 ml] | 0.1 or less | 0.1 or less | 0.1 or less | 0.1 or less | 0.1 or less | 0.1 or less | 0.1 or less | 0.1 or less |
| Content of catalyst | [mass %] | 0.10 | 0.10 | 0.10 | 0.10 | 0.10 | 0.10 | 0.10 | 0.10 |
| HLB value of nonionic surfactant | | 13.3 | 13.3 | 13.3 | 13.3 | 13.3 | 13.3 | 13.3 | 13.3 |
| Organic solvent | | PGME | IPA | PrOH | BuOH | PGME | EGBE | PGME | PGME |
| Solubility of organic solvent in water (20° C.) | [g/100 ml] | 10 or greater | 10 or greater | 10 or greater | 10 | 10 or greater | 10 or greater | 10 or greater | 10 or greater |
| Boiling point of organic solvent | [°C.] | 120 | 83 | 97 | 118 | 120 | 171 | 120 | 120 |
| Content of organic solvent | [parts by mass] | 5 | 10 | 10 | 10 | 10 | 10 | 20 | 30 |
| Reaction rate constant | k (70° C.) | 0.0251 | 0.0259 | 0.0156 | 0.0289 | 0.0321 | 0.0254 | 0.0255 | 0.0299 |
| | k (100° C.) | 0.1199 | 0.1215 | 0.1152 | 0.1205 | 0.1256 | 0.1228 | 0.1198 | 0.1201 |
| k (70° C.)/k (100° C.) | | 0.21 | 0.21 | 0.14 | 0.24 | 0.26 | 0.21 | 0.21 | 0.25 |
| Viscosity | Initial (before being left to stand) [mPa · s] | 69 | 63 | 67 | 71 | 65 | 68 | 72 | 80 |
| | After being left to stand at 40° C. for eight hours [mPa · s] | 75 | 72 | 75 | 83 | 77 | 80 | 83 | 90 |
| | Rate of increase [%] | 9 | 14 | 12 | 17 | 18 | 18 | 15 | 13 |

As shown in Tables 1 to 3, in isocyanate-curable water-based coating compositions containing a hydrophobic curing catalyst having solubility in water (under conditions of atmospheric pressure at 20° C.) of 1 g/100 ml or less and a nonionic surfactant having an HLB value of 10 to 15, it was confirmed that both of high curability at 100° C. and high storage stability at 40° C. were achieved (Examples 1 to 7). The reason for this is considered that at 40° C., the hydrophobic curing catalyst was protected by being taken into a micelle formed by the nonionic surfactant and thus the catalytic function was not developed, whereas at 100° C., the micelle was disintegrated to liberate the hydrophobic curing catalyst and thus the catalytic function was developed (the switching properties were developed).

On the other hand, it was found that when the HLB value of the nonionic surfactant was 9 or less, the storage stability at 40° C. was deteriorated (Comparative Examples 1, 2, 4, and 6). The reason for this is considered that the hydrophobic curing catalyst was not taken into the micelle and thus the switching properties were not developed. Moreover, it was found that when the HLB value of the nonionic surfactant was 16.6, the curability at 100° C. was deteriorated (Comparative Examples 3, 5, and 7). The reason for this is considered that even when the temperature reached 100° C., the hydrophobic curing catalyst was not released from the micelle and thus the catalytic function was not developed.

In addition, it was found that even when an amine-based curing catalyst was used, the storage stability at 40° C. was deteriorated (Comparative Examples 8 to 10). The reason for this is considered that the amine-based curing catalyst had high solubility in water and thus was not distributed not only in the micelle but also in an aqueous solvent, and the switching properties were not developed.

It was found that even when a surfactant was not used, the storage stability at 40° C. was deteriorated (Comparative Example 11). The reason for this is considered that the surfactant was not present and thus the micelle was not formed, and the switching properties were not developed.

In addition, it was found that when neither curing catalyst nor surfactant was contained, the storage stability at 40° C. was ensured but the curability at 100° C. was deteriorated, and baking 140° C. was needed to obtain curability equivalent to the curability at 100° C. of the water-based coating composition obtained in Example 1 (Comparative Example 12).

As shown in Table 4, even in isocyanate-curable water-based coating compositions containing an organic solvent having solubility in water (20° C.) of 10 g/100 ml or greater and a boiling point of 50° C. to 200° C., it was confirmed that both of high curability at 100° C. and high storage stability at 40° C. were achieved (Examples 8 to 15). The reason for this is considered that the highly hydrophilic organic solvent was difficult to be taken into the micelle formed by the nonionic surfactant, and thus the hydrophobic curing catalyst was not released from the micelle and was stably protected in the micelle.

NMR Measurement of Curing Catalyst-Containing Surfactant Aqueous Solution

Regarding the curing catalyst-containing surfactant aqueous solution S-1 prepared in Example 1 and the curing catalyst-containing surfactant aqueous solution CS-3 prepared in Comparative Example 3, $^1$H-NMR spectra were measured. Specifically, the curing catalyst-containing surfactant aqueous solutions were put into an NMR sample tube (diameter: 5 mm) for ordinary measurement, and by using a Fourier transform nuclear magnetic resonance (NMR) spectrometer ("JNM-ECA500" manufactured by JEOL Ltd.), $^1$H-NMR spectra were measured in a temperature range from room temperature to 90° C. in a case of the curing catalyst-containing surfactant aqueous solution S-1 and at 50° C. in a case of the curing catalyst-containing surfactant aqueous solution CS-3. The results are shown in FIGS. 1 and 2.

As shown in FIG. 1, it was found that in the $^1$H-NMR spectra of the curing catalyst-containing surfactant aqueous solution S-1, a peak derived from DBTL was not clear at a temperature range from room temperature to 40° C. but became clear at 50° C. or higher. The result indicates that in a temperature range from room temperature to 40° C., DBTL was protected by being encapsulated in a micelle formed by the nonionic surfactant and thus the molecular motion was suppressed, whereas at a temperature of 50° C. or higher, the micelle was disintegrated to liberate the DBTL from the protection and thus the molecular motion of the DBTL became active. Therefore, in the water-based coating composition according to the embodiment containing the nonionic surfactant having an HLB value within a predetermined range, it was considered that at a temperature of 40° C. or lower, the molecular motion of the curing catalyst was suppressed due to the nonionic surfactant, the contact of the curing catalyst with the polyol and the polyisocyanate was suppressed, and thus the curing reaction did not proceed, whereas at a temperature of 50° C. or higher, the curing catalyst was liberated from the protection with the nonionic surfactant, the molecular motion became active, the curing catalyst was activated by the contact with the polyol and the polyisocyanate, and thus the curing reaction proceeded even at 100° C.

Figure 2:
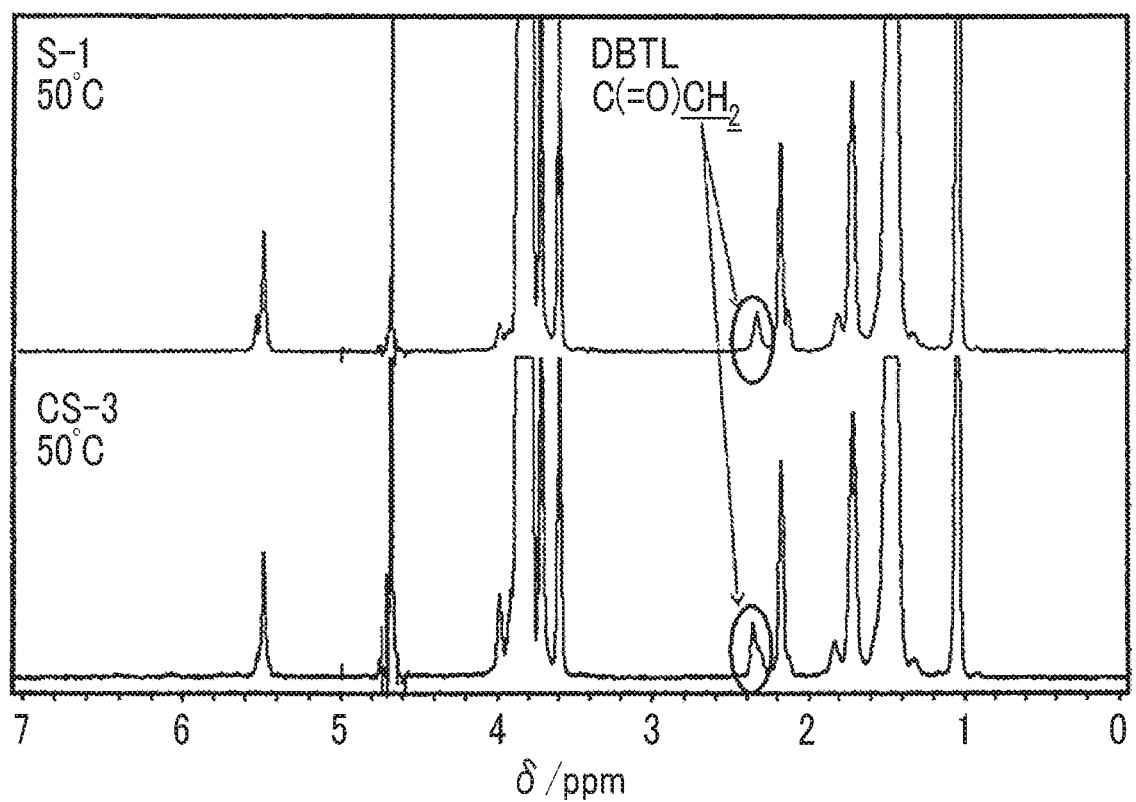
FIG. 2 is a graph showing $^1$H-NMR spectra of curing catalyst-containing surfactant aqueous solutions prepared in Example 1 and Comparative Example 3.

On the other hand, as shown in FIG. 2, in the $^1$H-NMR spectrum of the curing catalyst-containing surfactant aqueous solution CS-3, the peak derived from DBTL was not clear even at 50° C. The result indicates that even when the temperature reached 50° C., the DBTL encapsulated in the micelle formed by the nonionic surfactant was not liberated from the protection and the molecular motion was suppressed. Therefore, in a water-based coating composition containing a nonionic surfactant having an HLB value greater than a predetermined value, it was considered that even when the temperature reached 50° C., the curing catalyst was not liberated from the protection with the nonionic surfactant, the molecular motion was suppressed, the contact of the curing catalyst with the polyol and the polyisocyanate was suppressed, and thus the curing reaction did not proceed.

As described above, according to the embodiment, it is possible to obtain the isocyanate-curable water-based coating composition which contains the hydrophobic curing catalyst protected with the nonionic surfactant (preferably, by being encapsulated in the micelle formed by the nonionic surfactant).

Accordingly, the water-based coating composition according to the embodiment has both of excellent low-temperature curability and satisfactory storage stability for a long time, and thus is useful as a coating composition used for coating of bodies for vehicles such as a passenger car, a truck, a bus, and a motorcycle or components thereof.

What is claimed is:

1. A water-based coating composition comprising:
   a polyol;
   a polyisocyanate; and
   a micellized mixture solution obtained by mixing a hydrophobic curing catalyst and a nonionic surfactant,
   the hydrophobic curing catalyst being made of an organometallic compound containing at least one metal atom selected from the group consisting of Sn, Bi, Zr, Ti, and Al,
   solubility of the hydrophobic curing catalyst in water under conditions of atmospheric pressure at 20° C. being 1 g/100 ml or less,
   an HLB value determined by a Griffin method of the nonionic surfactant being 10 to 15,
   a content of the polyol being 30 mass % to 85 mass % with respect to 100 mass % of the total content of the polyol and the polyisocyanate,
   the hydrophobic curing catalyst being encapsulated in a micelle formed by the nonionic surfactant, and
   wherein an organic solvent is not contained.

* * * * *